US009696846B2

(12) United States Patent
Ma et al.

(10) Patent No.: US 9,696,846 B2
(45) Date of Patent: Jul. 4, 2017

(54) TOUCH DEVICE AND METHOD FOR DRIVING THE SAME

(71) Applicants: BOE Technology Group Co., Ltd., Beijing (CN); Hefei Xinsheng Optoelectronics Technology Co., Ltd., Anhui (CN)

(72) Inventors: Tao Ma, Beijing (CN); Dayu Zhang, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 0 days.

(21) Appl. No.: 14/769,143

(22) PCT Filed: Sep. 9, 2014

(86) PCT No.: PCT/CN2014/086120
§ 371 (c)(1),
(2) Date: Aug. 20, 2015

(87) PCT Pub. No.: WO2015/188477
PCT Pub. Date: Dec. 17, 2015

(65) Prior Publication Data
US 2016/0246431 A1    Aug. 25, 2016

(30) Foreign Application Priority Data

Jun. 11, 2014   (CN) .......................... 2014 1 0258784

(51) Int. Cl.
*G06F 3/041*   (2006.01)
*G06F 3/044*   (2006.01)
(Continued)

(52) U.S. Cl.
CPC ............ *G06F 3/0416* (2013.01); *G06F 3/044* (2013.01); *G06F 3/0421* (2013.01); *G06F 3/0436* (2013.01)

(58) Field of Classification Search
None
See application file for complete search history.

(56) References Cited

U.S. PATENT DOCUMENTS 8,451,239 B2   5/2013   Chen
9,235,301 B2   1/2016   Mo et al.
(Continued)

FOREIGN PATENT DOCUMENTS

CN    101833420 A    9/2010
CN    101866210 A    10/2010
(Continued)

OTHER PUBLICATIONS

International Search Report and Written Opinion for PCT Application No. PCT/CN2014/086120, dated Mar. 11, 2015, 8 pages.
(Continued)

*Primary Examiner* — Kenneth B Lee, Jr.
(74) *Attorney, Agent, or Firm* — Westman, Champlin & Koehler, P.A.

(57) ABSTRACT

The present disclosure discloses a touch device and a method for driving the same which is capable of enabling the touch device to operate a higher display refresh rate when there is no touch. The touch device comprises a touch panel, a timing controller, a touch controller, a controller, and a sensor. The sensor is configured to detect whether there is an object contacting or approaching the touch panel, and to output a first indication signal if there is no object contacting or approaching the touch panel and a second indication signal if there is an object contacting or approaching the touch panel. The controller is configured to control the
(Continued)

timing controller to output a first display scanning signal when the first indication signal is received and to control the timing controller to output a second display scanning signal when the second indication signal is received. The scanning frequency of the first display scanning signal is higher than that of the second display scanning signal.

12 Claims, 5 Drawing Sheets

(51) Int. Cl.
*G06F 3/042* (2006.01)
*G06F 3/043* (2006.01)

(56) References Cited

U.S. PATENT DOCUMENTS

| | | | |
|---|---|---|---|
| 9,268,437 | B2 | 2/2016 | Saitoh et al. |
| 2010/0265199 | A1* | 10/2010 | Chen .................. G06F 1/3203 345/173 |
| 2010/0321305 | A1 | 12/2010 | Chang et al. |
| 2012/0044166 | A1 | 2/2012 | Mizuhashi et al. |
| 2013/0257820 | A1 | 10/2013 | Yeh et al. |
| 2013/0314361 | A1 | 11/2013 | Saitoh et al. |
| 2014/0049512 | A1* | 2/2014 | Yang .................. G06F 3/0416 345/174 |
| 2014/0111467 | A1 | 4/2014 | Chen et al. |
| 2014/0118301 | A1 | 5/2014 | Cho et al. |
| 2014/0152617 | A1 | 6/2014 | Kida et al. |

FOREIGN PATENT DOCUMENTS

| | | |
|---|---|---|
| CN | 102999212 A | 3/2013 |
| CN | 103092408 A | 5/2013 |
| CN | 103149723 A | 6/2013 |
| CN | 103151019 A | 6/2013 |
| CN | 103186426 A | 7/2013 |
| CN | 103279214 A | 9/2013 |
| CN | 103299255 A | 9/2013 |
| WO | 2013/075137 A1 | 5/2013 |

OTHER PUBLICATIONS

English translation of Box No. V from the Written Opinion of the International Searching Authority for PCT Application No. PCT/CN2014/086120, 2 pages.

First Office Action, including Search Report, for Chinese Patent Application No. 201410258784.8, dated Jun. 28, 2016, 15 pages.

Extended European search report pursuant to Rule 62 EPC for European Patent Application No. 14882147.3-1507, dated Dec. 9, 2016, 7 pages.

* cited by examiner

TOUCH DEVICE AND METHOD FOR DRIVING THE SAME

CROSS-REFERENCE TO RELATED APPLICATION(S)

This application is a Section 371 National Stage Application of International Application No. PCT/CN2014/086120, filed 9 Sep. 2014, which claims priority to the Chinese Application No. 201410258784.8, filed on Jun. 11, 2014, entitled "TOUCH DEVICE AND METHOD FOR DRIVING THE SAME," which is incorporated herein by reference in its entirety.

TECHNICAL FIELD

The present disclosure relates to the field of display technology, and in particular, to a touch device and a method for driving the same.

BACKGROUND

As compared with an Out-Cell capacitive touch screen structure, a touch substrate may be omitted from a capacitive touch screen by using the In-Cell touch technology, such that the whole display module may be manufactured in a thinner way. A structural diagram of a liquid crystal display screen using the In-Cell touch technology is shown as FIG. 1 in which touch driving electrodes (Tx) and touch sensing electrodes (Rx) are manufactured on a glass substrate on an array substrate side of the liquid crystal display panel. The Tx lines share same lines with common electrodes (Vcom) lines. Various parasitic capacitances and coupling capacitances may occur in the liquid crystal display screen (i.e. the capacitive touch screen) using the In-Cell touch technology between the Tx and Rx and the Thin Film Transistor (TFT) display devices. In the figure, each of Gate1, Gate2, . . . , Gate n denotes a gate scan line for each line of pixels, respectively; each of Data1, Data2, . . . , Data n denotes a data scan line for each line of pixels, respectively; $C_{LC}$ denotes a capacitance between the liquid crystal display panels; and Cs denotes a storage capacitance.

FIG. 2(a) shows an example of timings for display scanning and touch scanning of an Out-Cell capacitive touch screen, in which a1-a60 denote periods for display scanning and t1-t60 denote periods for touch scanning. As shown in FIG. 2(a), for an Out-Cell capacitive touch screen, the touch scanning is performed in synchronization with the picture refresh since the Out-Cell capacitive touch screen is not affected by TFT driving signals. In other words, the display scanning and touch scanning for a capacitive touch screen are performed in synchronization and they are not affected by each other. As shown, the scanning frequency for the display scanning is 60 Hz, and the scanning frequency for the touch scanning is 100 Hz. FIG. 2(b) shows an example of timings for display scanning and touch scanning of a capacitive touch screen using the In-Cell touch technology, in which a1-a60 denote periods for display scanning and t1-t60 denote periods for touch scanning. As shown in FIG. 2(b), the In-Cell touch technology utilizes a scanning mode in which the scanning is performed in a blank interval between two frames of pictures. In other words, the display scanning and touch scanning for the liquid crystal display screen shall be performed in a time-sharing manner. As shown, the scanning frequency for the display scanning is 40 Hz, and the scanning frequency for the touch scanning is 40 Hz.

A system block diagram of a liquid crystal display screen using the In-Cell touch technology is shown as FIG. 3. Touch scanning time, t, assigned to each frame is limited due to the limitation of data transmission rates of the timing controller and driver and charging time of sub-pixels. When t is small, scannings of Tx and Rx cannot be finished, and therefore t is to be increased appropriately. Currently, the direct way to increase t is to increase the scanning time of a frame, and the assigned touch scanning time is increased accordingly. However, this will lead to a lower frame rate, and the quality of the picture will be deteriorated. Flickering, smearing, or the like will occur.

In summary, since a liquid crystal display screen using the In-Cell touch technology utilizes a time-sharing driving method, the liquid crystal display screen cannot operate at a higher display refresh rate when there is no touch.

SUMMARY

Embodiments of the present disclosure provide a touch device and a method for driving the same which is capable of enabling the touch device to operate at a higher display refresh rate when there is no touch and improving the display effect.

An embodiment of the present disclosure provides a touch device comprising: a touch panel configured to display content, to refresh the displayed content according to a display scanning signal, and capable of sensing a touch on the touch panel and cooperating with a touch controller to scan the touch; a timing controller configured to output the display scanning signal to the touch panel; the touch controller configured to scan and locate the touch on the touch panel; a sensor configured to detect whether there is an object contacting or approaching the touch panel and to output a first indication signal if there is no object contacting or approaching the touch panel and a second indication signal if there is an object contacting or approaching the touch panel; and a controller configured to control the timing controller to output a first display scanning signal when the first indication signal is received and to control the timing controller to output a second display scanning signal when the second indication signal is received, wherein the scanning frequency of the first display scanning signal is higher than that of the second display scanning signal.

According to an embodiment of the present disclosure, the controller is further configured to: control the touch controller to not operate when the first indication signal is received; and control the touch controller to begin operating when the second indication signal is received.

The touch device according to an embodiment of the present disclosure has a timing controller that outputs display scanning signals having different scanning frequencies when there is a touch on the touch panel and when there is no touch on the touch panel. Further, when there is no touch, the touch controller does not operate. Therefore, the touch device provided by an embodiment of the present disclosure may operate at a higher display refresh rate when there is no touch, thereby improving display effect and reducing power consumption.

According to an embodiment of the present disclosure, the sensor comprises transmitters and receivers, wherein the transmitters are configured to transmit light wave or sound wave towards proximity of the touch panel; and the receivers are configured to receive the light wave or the sound wave and determine whether there is an object contacting or approaching the touch panel based on the change in the light wave or sound wave.

In this way, when the sensor comprises the transmitters and the receivers, it is more convenient and simpler to detect whether there is an object contacting or approaching the touch panel in practice.

According to an embodiment of the present disclosure, the number of the transmitters is equal to that of the receivers.

In this way, by setting the number of transmitters and the number of the receivers to be equal, it is more convenient and simpler in practice.

According to an embodiment of the present disclosure, the transmitters are located in four corner areas of the touch panel.

In this way, by disposing the transmitters in the four corner areas of the touch panel, it is more convenient and simpler in practice.

According to an embodiment of the present disclosure, the number of the transmitters is two.

In this way, by setting the number of transmitters to be two, it is more convenient and simpler and cost-efficient in practice.

According to an embodiment of the present disclosure, the transmitters are ultrasonic transmitters or infrared transmitters.

In this way, when the transmitters are ultrasonic transmitters or infrared transmitters, the principles are simple and stable in practice.

According to an embodiment of the present disclosure, the receivers are located in four corner areas of the touch panel.

In this way, by disposing the receivers in the four corner areas of the touch panel, it is more convenient and simpler in practice.

According to an embodiment of the present disclosure, the receivers are ultrasonic receivers or infrared receivers.

In this way, when the receivers are ultrasonic receivers or infrared receivers, the principles are simple and stable in practice.

An embodiment of the present disclosure further provides a method for driving a touch device, comprising: detecting whether there is an object contacting or approaching a touch panel of the touch device, wherein the touch panel is configured to display content, to refresh the displayed content according to a display scanning signal, and is capable of sensing a touch on the touch panel and cooperating with a touch controller to scan the touch; outputting a second display scanning signal to the touch panel if there is an object contacting or approaching the touch panel, and outputting a first display scanning signal to the touch panel if there is no object contacting or approaching the touch panel, wherein the scanning frequency of the first display scanning signal is higher than that of the second display scanning signal.

According to an embodiment of the present disclosure, the method for driving further comprises: controlling the touch controller to not operate when the first display scanning signal is output; and controlling the touch controller to begin operating when the second display scanning signal is output.

The method for driving a touch device according to an embodiment of the present disclosure outputs display scanning signals having different scanning frequencies to the touch panel when there is a touch on the touch panel and when there is no touch on the touch panel. Further, when there is no touch, the touch controller does not operate. Therefore, the method for driving provided by an embodiment of the present disclosure may enable the touch device to operate at a higher display refresh rate when there is no touch, thereby reducing power consumption of the touch device.

According to an embodiment of the present disclosure, the detecting of whether there is an object contacting or approaching a touch panel of the touch device further comprises: transmitting light wave or sound wave towards proximity of the touch panel; and receiving the light wave or the sound wave and determining whether there is an object contacting or approaching the touch panel based on the change in the light wave or sound wave.

In this way, by using the light wave or the sound wave, it is more convenient and simpler to detect whether there is an object contacting or approaching the touch panel in practice.

DETAILED DESCRIPTION

Embodiments of the present disclosure provide a touch device and a method for driving the same which enable the touch device to operate at a higher display refresh rate when there is no touch and improve the display effect.

A touch device and its operations according to an embodiment of the present disclosure will be introduced below in detail with reference to the drawings.

Figure 1:
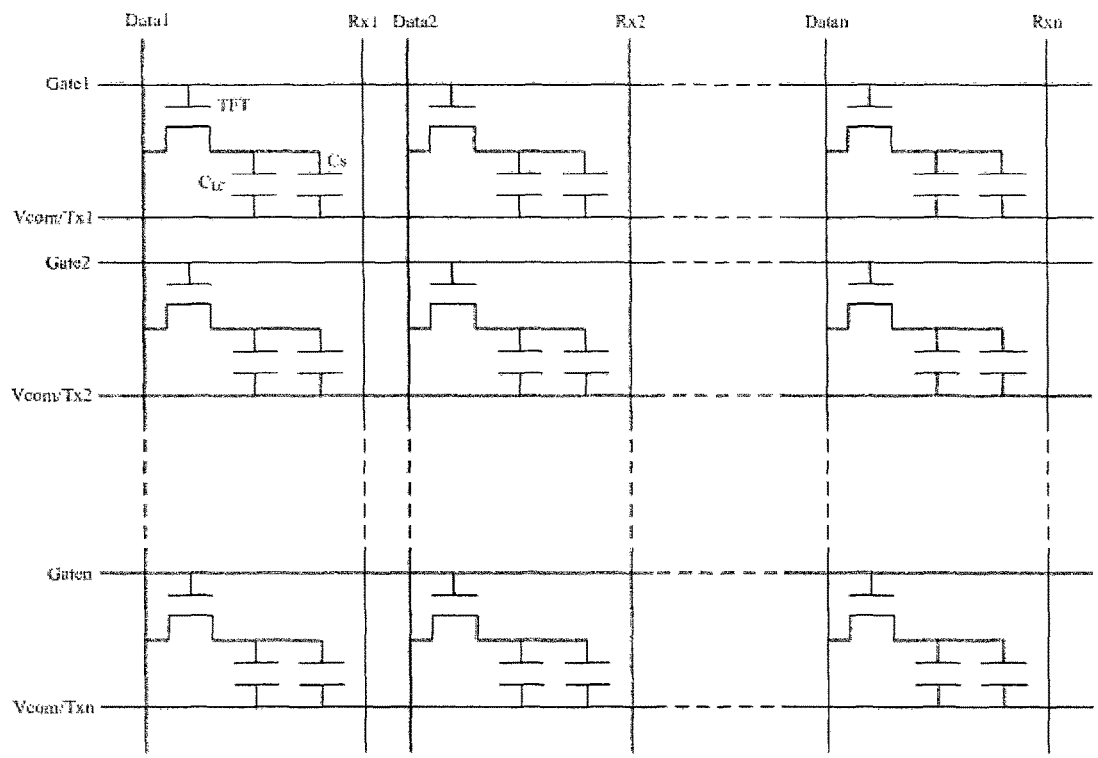
FIG. 1 is a diagram of a structure of a liquid crystal display screen using the In-Cell touch technology.
Figure 2A:
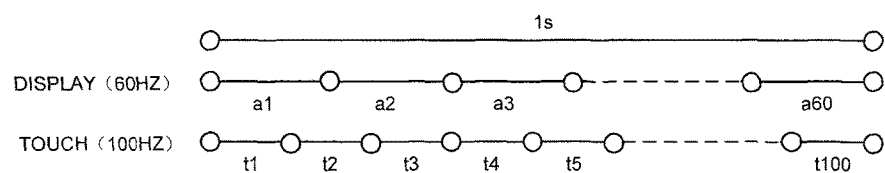
FIG. 2(a) and FIG. 2(b) are diagrams showing operation timings of an Out-Cell capacitive touch screen and a liquid crystal display screen using the In-Cell touch technology, respectively.
Figure 2B:
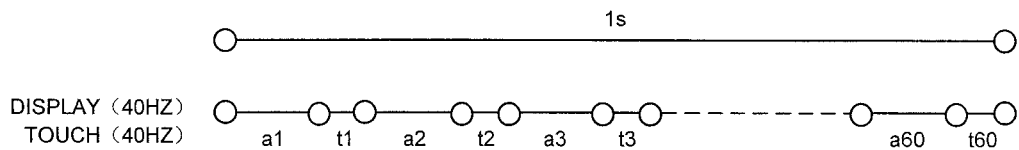
Figure 3:
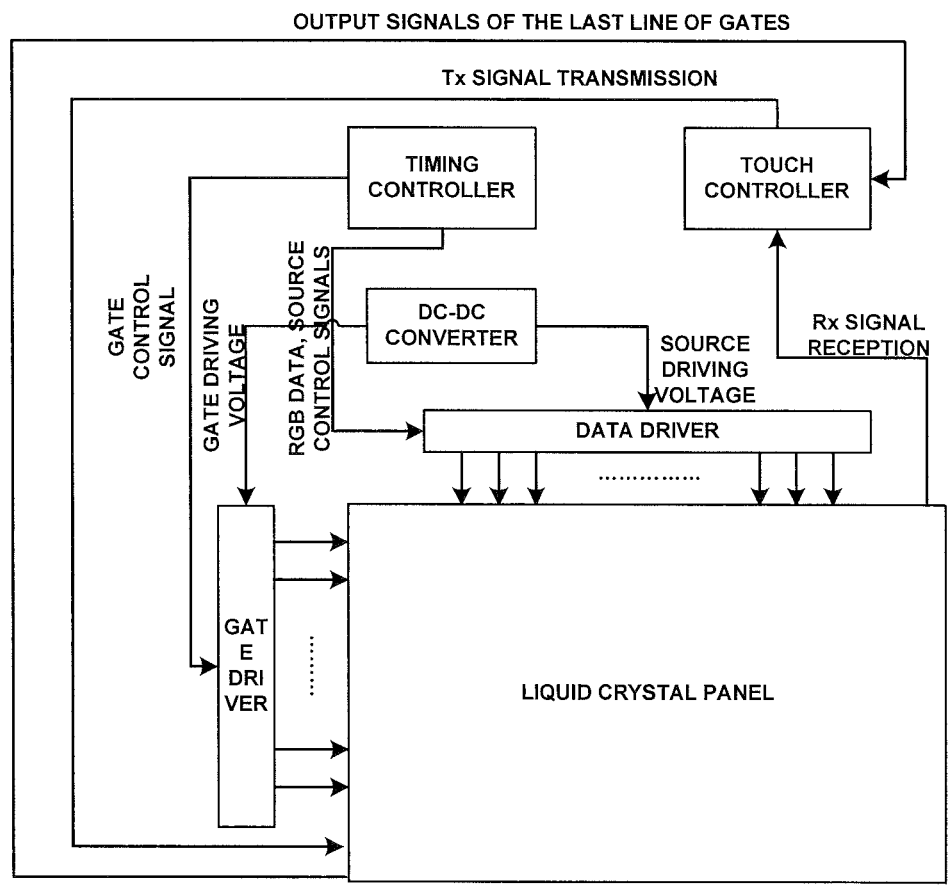
FIG. 3 is a systematic block diagram of a liquid crystal display screen using the In-Cell touch technology.
Figure 4:
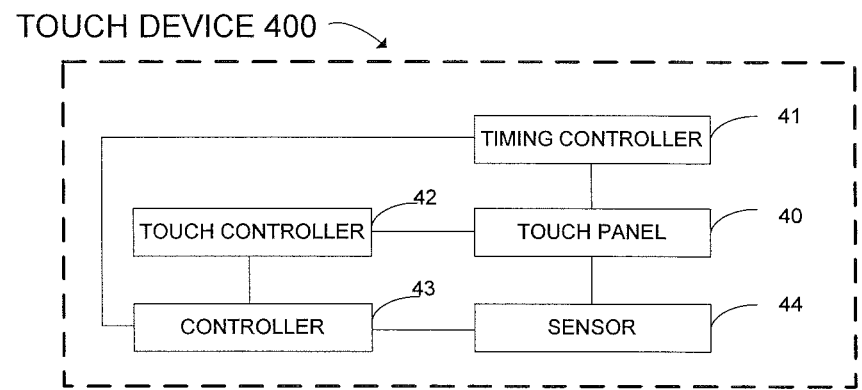
FIG. 4 is a diagram of a touch device according to an embodiment of the present disclosure.

FIG. 4 is a diagram showing a touch device 400 according to an embodiment of the present disclosure. As shown in FIG. 4, the touch device 400 according to the embodiment of the present disclosure comprises: a touch panel 40, a timing controller 41, a touch controller 42, a controller 43, and a sensor 44. The touch panel 40 displays content, refreshes the displayed content according to a display scanning signal, and is capable of sensing a touch on the touch panel 40 and cooperating with the touch controller 42 to scan the touch. The timing controller 41 is configured to output the display scanning signal to the touch panel 40. The touch controller 42 is configured to scan and locate the touch on the touch panel 40.

The sensor 44 is configured to detect whether there is an object contacting or approaching the touch panel 40, and output a first indication signal to the controller 43 when there is no object contacting or approaching the touch panel 40 and a second indication signal to the controller 43 when there is an object contacting or approaching the touch panel 40.

When the first indication signal is received from the sensor 44, the controller 43 controls the timing controller 41 to output a first display scanning signal to the touch panel 40; and when the second indication signal is received from the sensor 44, the controller 43 controls the timing controller 41 to output a second display scanning signal to the touch panel 40.

The scanning frequency of the first display scanning signal is higher than that of the second display scanning signal.

When the first indication signal is received, the controller 43 further controls the touch controller 42 to not operate, and when the second indication signal is received, the controller 43 controls the touch controller 42 to begin operating.

The first and second indication signals output by the sensor 44 may be a low level signal and a high level signal, and may also be digital signals.

To be specific, an example where the first indication signal is a high level signal and the second indication signal is a low level signal is given. When there is no object contacting or approaching the touch panel 40, the sensor 44 outputs a high level signal, and transmits the signal to the controller 43. The controller 43 in turn controls the touch controller 42 to not operate, and controls the timing controller 41 to output the first display scanning signal. When there is an object contacting or approaching the touch panel 40, the sensor 44 outputs a low level signal, and transmits the signal to the controller 43. The controller 43 in turn controls the timing controller 41 to output the second display scanning signal, and controls the touch controller 42 to begin operating. That is, the touch controller 42 begins to scan and locate the touch on the touch panel 40.

To be specific, the controller 43 may be an integrated circuit disposed directly in the touch panel or an integrated circuit disposed in a Flexible Printed Circuit (FPC). Further, it can also be disposed at other locations, and no limitation is imposed to its position in the embodiments of the present disclosure.

Figure 5:
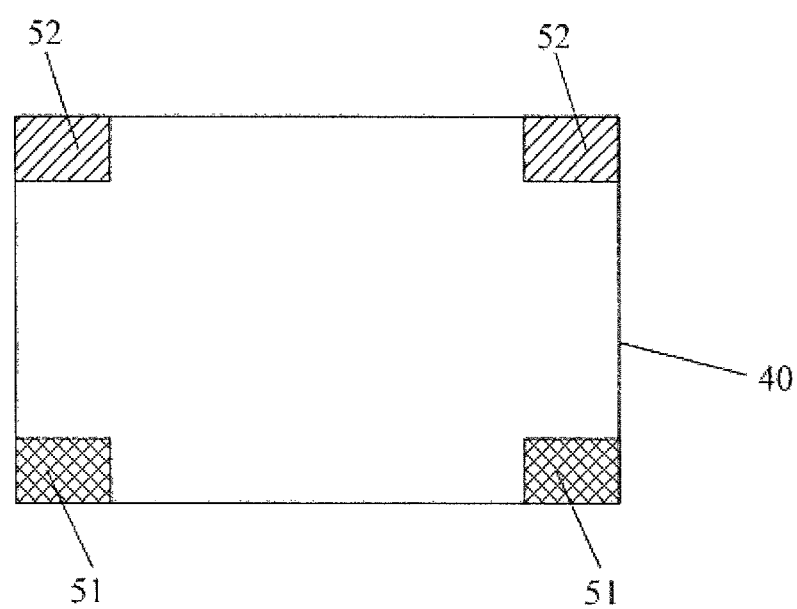
FIG. 5 is a diagram showing positions of transmitters and receivers in a touch device according to an embodiment of the present disclosure.

The sensor 44 in the embodiment of the present disclosure comprises transmitters 51 and receivers 52. FIG. 5 is a diagram showing positions of transmitters 51 and receivers 52 in a touch device according to an embodiment of the present disclosure.

The transmitters 51 are configured to transmit a light wave or a sound wave towards proximity of the touch panel 40.

The receivers 52 are configured to receive the light wave or the sound wave, and determine whether there is an object contacting or approaching the touch panel based on the change in the light wave or the sound wave.

To be specific, in an embodiment of the present disclosure, the number of the transmitters 51 is equal to that of the receives 52. In the embodiment of the present disclosure, the number of transmitters 51 is two, and the transmitters 51 are located at the bottom left corner and bottom right corner of the touch panel 40, respectively. Of course, the transmitters may also be located at the top left corner and top right corner of the touch panel 40, respectively. There is no limitation to the number and positions of the transmitters in the embodiments of the present disclosure. In an embodiment of the present disclosure, the transmitters may be ultrasonic transmitters or infrared transmitters. Also, there is no limitation to the type of the transmitters in the embodiments of the present disclosure. The transmitters may be other types of sensors, such as, laser transmitters, or the like. In an embodiment of the present disclosure, the number of the receivers 52 is two, and the receivers 52 are located at the top left corner and top right corner of the touch panel 40, respectively. Of course, the receivers may also be located at the bottom left corner and bottom right corner of the touch panel 40, respectively. There is no limitation imposed to the number and positions of the receivers in the embodiments of the present disclosure. In an embodiment of the present disclosure, the receivers may be ultrasonic receivers or infrared receivers. Also, there is no limitation to the type of the receivers in the embodiments of the present disclosure. The receivers may be other types of sensors, such as, laser receivers, or the like.

Figure 6:
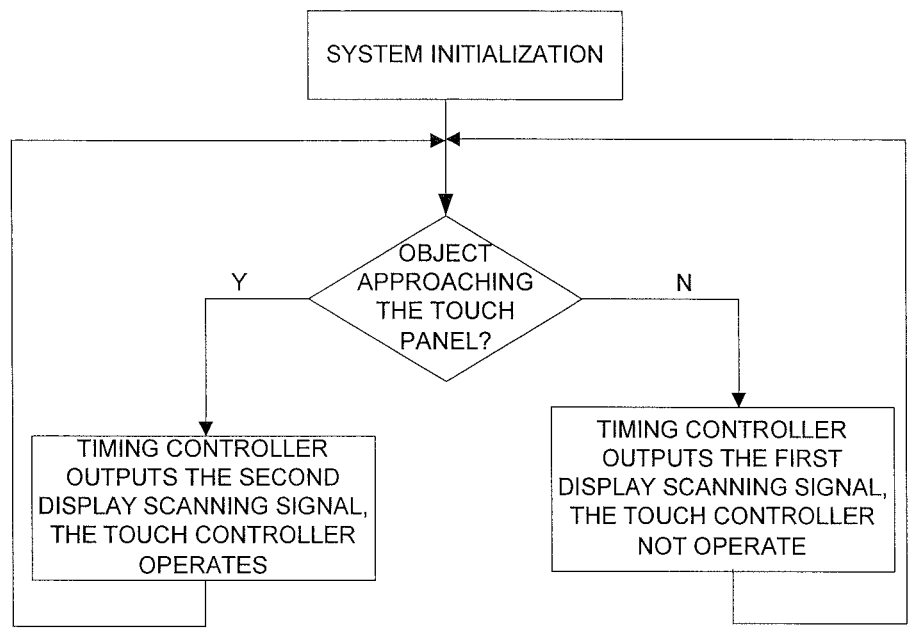
FIG. 6 is a flow chart of operations for a touch device according to an embodiment of the present disclosure.

To be specific, with reference to FIG. 6, an operational process of a touch device according to an embodiment of the present disclosure will be described. As shown in FIG. 6, at the outset, the system is initialized. After the initialization, the timing controller 41 outputs the first display scanning signal to the touch panel 40 for scanning and the touch controller 42 does not operate. Under the control of the first display scanning signal, the touch panel (for example, a liquid crystal display screen) operates at a normal display scanning frequency; meanwhile, the transmitters 51 located at the bottom left corner and the bottom right corner of the touch panel 40 begin scanning to transmit light waves or sound waves. When the transmitters 51 are ultrasonic transmitters, the ultrasonic waves are transmitted. When the transmitters 51 are infrared transmitters, the infrared waves are transmitted. At the same time, the receivers 52 located at the top left corner and the top right corner of the touch panel 40 begin scanning to receive the light waves or sound waves transmitted by the transmitters 51, and determine whether there is an object contacting or approaching the touch panel based on the change in the light wave or the sound wave. When there is no object contacting or approaching the touch panel, the first indication signal is output to the controller 43; and when there is an object contacting or approaching the touch panel, the second indication signal is output to the controller 43. If the received light wave or sound wave is not changed, then it can be determined that no object is contacting or approaching the touch panel. At this time, the controller 43 controls the timing controller 41 to keep outputting the first display scanning signal and also controls the touch controller 42 to not operate. If the received light wave or sound wave is changed, then it can be determined that there is an object contacting or approaching the touch panel. At this time, the controller 43 controls the timing controller 41 to output the second display scanning signal and also controls the touch controller 42 to begin operating. In this way, the display scanning and the touch scanning for the touch panel 40 are driven in a time-sharing manner. The specific operations and methods for a time-sharing driving are same as those in the related art, and description thereof will be omitted for simplicity.

Figure 7:
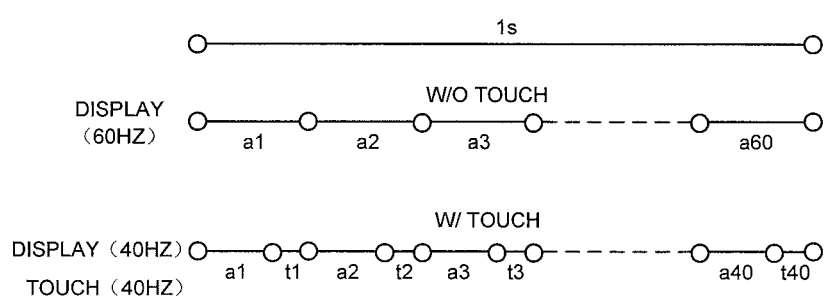
FIG. 7 is a timing diagram showing operations of a touch panel when there is a touch and when there is no touch according to an embodiment of the present disclosure.

To be specific, in an embodiment of the present disclosure, when there is an object contacting or approaching the touch panel, it will be determined that there is a touch on the touch panel. Accordingly, the light wave or sound wave transmitted by the transmitters 51 are used for sensing the contacting or approaching of the touch panel. Herein, "the proximity of the touch panel" refers to a range in which the transmitted light wave or sound wave can be sensed, and it can be set as required. FIG. 7 is a timing diagram showing operations of a touch panel when there is a touch and when there is no touch according to an embodiment of the present disclosure. As shown in FIG. 7, an example of the ultrasonic wave is used to illustrate the timing of the operations of the touch device according to an embodiment of the present disclosure. When there is no object contacting or approaching the surface of the touch panel, the timing controller 41 outputs the first display scanning signal and controls the touch panel to operate at a normal display scanning frequency. For example, in a specific embodiment of the present disclosure, the display scanning frequency is 60 Hz, and at this time the touch controller 42 does not operate. When there is an object contacting or approaching the surface of the touch panel, the ultrasonic wave transmitted by the ultrasonic transmitters will be interfered. At this time, it can be determined by the receivers that there is an object contacting of approaching the surface of the touch panel by analyzing the received ultrasonic waves. When the receivers determine that there is an object contacting or approaching the surface of the touch panels, the controller 43 controls the touch controller 42 to begin operating, and controls the timing controller 41 to output the second display scanning signal simultaneously. Since the scanning frequency of the first display scanning signal is higher than that of the second display scanning signal in an embodiment of the present disclosure, the display scanning frequency of the touch panel is lowered at this time. In this way, it ensures the touch controller 42 enough time for scanning, thereby achieving the time-sharing driving of the display scanning and the touch scanning for the touch panel. For example, in a specific embodiment of the present disclosure, the display scanning frequency is 40 Hz, and the touch scanning frequency is 40 Hz. When the receives determine that there is no object contacting or approaching the surface of the touch panel, the controller 43 controls the touch controller 42 to stop operating, and controls the timing controller 41 to output the first display scanning signal simultaneously. At this time, the touch panel operates at a normal display scanning frequency. For example, in a specific embodiment of the present disclosure, the display scanning frequency is 60 Hz.

Figure 8:
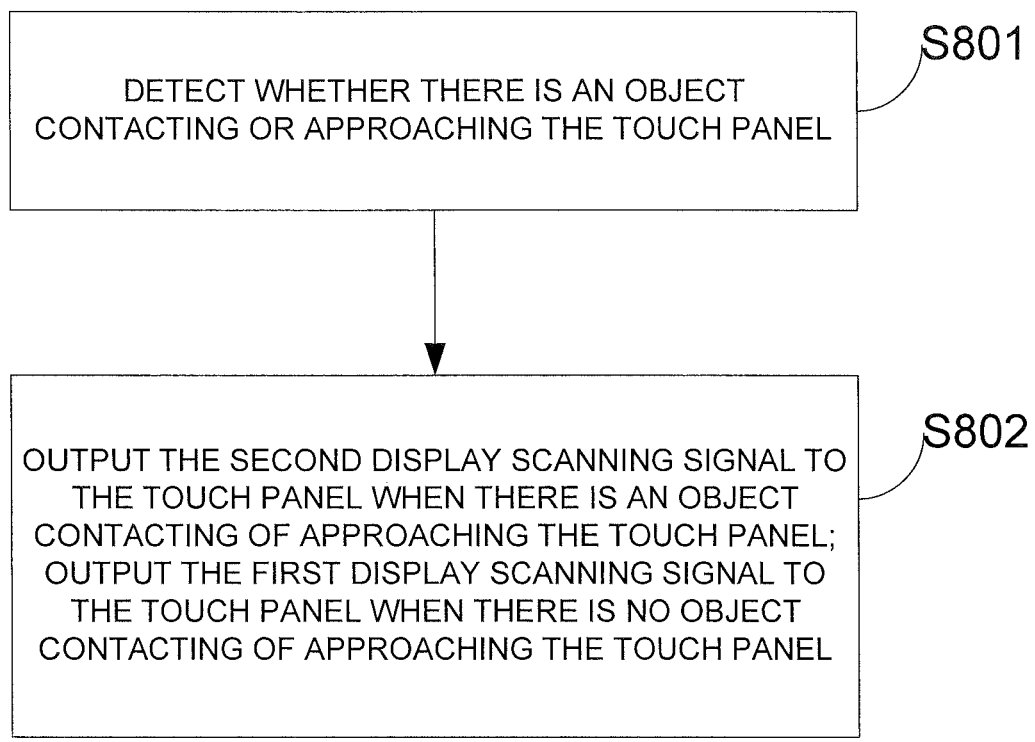
FIG. 8 is a flow chart showing a driving method according to an embodiment of the present disclosure.

FIG. 8 is a flow chart showing a driving method according to an embodiment of the present disclosure. This method comprises:

S801: whether there is an object contacting or approaching the touch panel is detected.

S802: If there is an object contacting or approaching the touch panel, the second display scanning signal is output to the touch panel, and otherwise, if there is no object contacting or approaching the touch panel, the first display scanning signal is output to the touch panel. The scanning frequency of the first display scanning signal is higher than that of the second display scanning signal.

In summary, by adding sensors and controllers to a touch device which uses the In-Cell touch technology, specific embodiments of the present disclosure enable the touch scanning of the touch device which uses the In-Cell touch technology to operate during the touch event, thereby resolving the conflict that the display scanning and the touch scanning of the touch device using the In-Cell touch technology should be performed in a time-sharing manner. In this way, the touch device is enabled to operate at a higher display refresh rate when there is no touch.

Obviously, one skilled in the art may make various changes and variations of the present disclosure without departing from the spirit and scope of the present disclosure. In this way, if the changes and variations of the present disclosure fall into the scope of the claims of the present application and the full equivalents thereof, then the present disclosure is intended to cover such changes and variations.

We claim:

1. A touch device comprising:
a touch panel configured to display content, to refresh the displayed content according to a display scanning signal, and capable of sensing a touch on the touch panel and cooperating with a touch controller to scan the touch;
a timing controller configured to output the display scanning signal to the touch panel;
the touch controller configured to scan and locate the touch on the touch panel;
a sensor configured to detect whether there is an object contacting or approaching the touch panel, and to output a first indication signal if there is no object contacting or approaching the touch panel and a second indication signal if there is an object contacting or approaching the touch panel; and
a controller configured to control the timing controller to output a first display scanning signal when the first indication signal is received and to control the timing controller to output a second display scanning signal when the second indication signal is received,
wherein the scanning frequency of the first display scanning signal is higher than that of the second display scanning signal.

2. The touch device according to claim 1, wherein the controller is further configured to:
control the touch controller to not operate when the first indication signal is received; and
control the touch controller to begin operating when the second indication signal is received.

3. The touch device according to claim 1, wherein the sensor comprises transmitters and receivers, and wherein
the transmitters are configured to transmit light waves or sound waves towards proximity of the touch panel; and
the receivers are configured to receive the light waves or the sound waves and determine whether there is an object contacting or approaching the touch panel based on the change in the light waves or sound waves.

4. The touch device according to claim 3, wherein the number of the transmitters is equal to that of the receivers.

5. The touch device according to claim 4, wherein the transmitters are located in four corner areas of the touch panel.

6. The touch device according to claim 5, wherein the number of the transmitters is two.

7. The touch device according to claim 6, wherein the transmitters are ultrasonic transmitters or infrared transmitters.

8. The touch device according to claim 4, wherein the receivers are located in four corner areas of the touch panel.

9. The touch device according to claim 8, wherein the receivers are ultrasonic receivers or infrared receivers.

10. A method for driving a touch device, comprising:
detecting whether there is an object contacting or approaching a touch panel of the touch device, wherein the touch panel is configured to display content, to refresh the displayed content according to a display scanning signal, and is capable of sensing a touch on the touch panel and cooperating with a touch controller to scan the touch; and
outputting a second display scanning signal to the touch panel if there is an object contacting or approaching the touch panel, and
outputting a first display scanning signal to the touch panel if there is no object contacting or approaching the touch panel, wherein the scanning frequency of the first display scanning signal is higher than that of the second display scanning signal.

11. The method for driving according to claim 10, further comprising:
controlling the touch controller to not operate when the first display scanning signal is output; and
controlling the touch controller to begin operating when the second display scanning signal is output.

12. The method for driving according to claim 10, wherein the detecting of whether there is an object contacting or approaching a touch panel of the touch device further comprises:
transmitting light waves or sound waves towards proximity of the touch panel; and
receiving the light waves or the sound waves and determining whether there is an object contacting or approaching the touch panel based on the change in the light wave or sound wave.

* * * * *